United States Patent
Thomas (10) Patent No.: US 7,516,184 B2
(45) Date of Patent: Apr. 7, 2009

(54) METHOD AND SYSTEM FOR A METHOD FOR EVALUATING A MESSAGE BASED IN PART ON A REGISTRAR REPUTATION

(75) Inventor: Michael Thomas, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 11/286,543

(22) Filed: Nov. 22, 2005

(65) Prior Publication Data

US 2007/0124388 A1    May 31, 2007

(51) Int. Cl.
G06F 15/16    (2006.01)
G06F 7/04    (2006.01)

(52) U.S. Cl. ............................... 709/206; 726/4
(58) Field of Classification Search ................ 709/206; 726/4
See application file for complete search history.

(56) References Cited

U.S. PATENT DOCUMENTS

| | | | | |
|---|---|---|---|---|
| 6,374,292 | B1* | 4/2002 | Srivastava et al. | 709/206 |
| 7,293,065 | B2* | 11/2007 | Banister et al. | 709/206 |
| 2004/0193924 | A1* | 9/2004 | Kira et al. | 713/201 |
| 2006/0004896 | A1* | 1/2006 | Nelson et al. | 707/206 |
| 2006/0031330 | A1* | 2/2006 | Ruiz | 709/206 |
| 2006/0095404 | A1* | 5/2006 | Adelman et al. | 707/3 |
| 2006/0095459 | A1* | 5/2006 | Adelman et al. | 707/102 |
| 2006/0095586 | A1* | 5/2006 | Adelman et al. | 709/245 |
| 2006/0168161 | A1* | 7/2006 | Adelman et al. | 709/220 |
| 2006/0200487 | A1* | 9/2006 | Adelman et al. | 707/102 |
| 2006/0253582 | A1* | 11/2006 | Dixon et al. | 709/225 |
| 2006/0253584 | A1* | 11/2006 | Dixon et al. | 709/225 |
| 2007/0028301 | A1* | 2/2007 | Shull et al. | 726/22 |
| 2007/0162349 | A1* | 7/2007 | Silver | 705/26 |
| 2007/0208869 | A1* | 9/2007 | Adelman et al. | 709/229 |
| 2007/0208940 | A1* | 9/2007 | Adelman et al. | 713/168 |
| 2007/0299915 | A1* | 12/2007 | Shraim et al. | 709/206 |
| 2008/0133540 | A1* | 6/2008 | Hubbard et al. | 707/10 |

OTHER PUBLICATIONS

"Email Authentication Summit", The Federal Trade Commission, http://www.ftc.gov/bcp/workshops/e-authentication/.*
www.mailshell.com, Tonny Yu, "Stopping Spam by Reputation", 9 pages total, Nov. 10, 2004; Mailshell, www.ttc.gov/bcp/workshops/e-authentication/presentations/11-10-04-yu-mailsell.pdf.
Icann.org, Elana Broitman, "Discussion Paper on Transfer of Sponsorship of Registrations between Registrars," 5 pages total, Aug. 28, 2001; Icann, www.icann.org/montevideo/tonkin-position-paper-27aug01.htm.

* cited by examiner

Primary Examiner—Douglas B Blair
(74) Attorney, Agent, or Firm—Stolowitz Ford Cowger LLP

(57) ABSTRACT

A method and system for evaluating a message. A message including an originator is received. A registrar lookup for determining a registrar for the originator is performed. A registrar reputation lookup for determining a registrar reputation for the registrar is performed. The message is evaluated based at least in part on the registrar reputation.

21 Claims, 5 Drawing Sheets

METHOD AND SYSTEM FOR A METHOD FOR EVALUATING A MESSAGE BASED IN PART ON A REGISTRAR REPUTATION

FIELD OF INVENTION

The present invention relates to the field of electronic messaging. Specifically, the present invention relates to a method and system for evaluating a message based on a registrar reputation.

BACKGROUND OF THE INVENTION

The use of electronic mail (email) allows users anywhere in the world to communicate with each other over the Internet. In recent years, Internet users have been subjected to a torrent of unwanted email messages. These unwanted messages generally take two forms: 1) messages originated by "spammers" to send advertising or solicitation, or as part of a confidence scheme, and 2) messages sent automatically by worms and other malicious software (malware) attempting to infect additional systems. In both cases, a large proportion of the messages attempt to disguise their true source to frustrate attempts to shut down the spammer, to disguise the identity of the infected system sending the message, or to support a social-engineering goal.

In an effort to reduce or eliminate the transmission of unwanted email messages, various approaches have been proposed to assert and verify the identity of the origination address of an email. One example of these approaches is the use of identified mail as described in co-pending, commonly-owned U.S. patent application Ser. No. 10/859,402, filed Jun. 1, 2004, by James Fenton et al., and entitled "A METHOD AND SYSTEM FOR VERIFYING IDENTIFICATION OF AN ELECTRONIC MAIL MESSAGE." Other approaches include path-based approaches for attempting to verify the identity of the sender by verifying the Internet Protocol (IP) address of the message source, signature-based identification schemes including Pretty Good Privacy (PGP) and Secure Multipurpose Internet Mail Extensions (S/MIME), and certificate schemes.

It is anticipated that as the verification of the originator of an email is regularly implemented, spammers and other senders of unwanted email will attempt to adapt to these new restraints in order to continue sending unwanted email. One potential way for spammers to attempt to circumvent identity verification is by registering legitimately obtained domain names. However, the behavior of these domains can be reasonably bound to the domain name, resulting in quick detection of spammers based on such behavior. This behavior can be detected rapidly, and within a matter of hours or days a domain will be identified as a likely spammer. These spammer domains can then be easily blocked, for example by using real-time black lists (RBLs).

This will in turn place pressure on spammers to have a reserve of fresh domain names that are not identified as the originators of unwanted email. It is anticipated that spammers will utilize throw-away domain names, rapidly abandoning domains names once they are identified as likely spammers. Registrars may or may not facilitate obtaining fresh domains, however it should be noted that it is in the economic interest of the registrars to sell as many domains as possible. Currently, there is no incentive for a registrar to not sell domain names to spammers.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Various embodiments of the present invention, a method and system for evaluating a message based in part on the registrar reputation, are described herein. A message including an originator is received. In one embodiment, the originator of the message is authenticated. A registrar lookup for determining a registrar for the originator is performed. A registrar reputation lookup for determining a registrar reputation for the registrar is performed. The message is evaluated based at least in part on the registrar reputation. The register reputation provides additional information for evaluating whether a received message is an unwanted message, wherein an unwanted message is not delivered to a recipient, marked in a way so as to alert a user, or other methods to highlight that the message may not be wanted.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "performing", "determining", "evaluating", "authenticating", "transmitting", "accessing", "verifying", or the like, refer to the actions and processes of a computer system or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Figure 1:
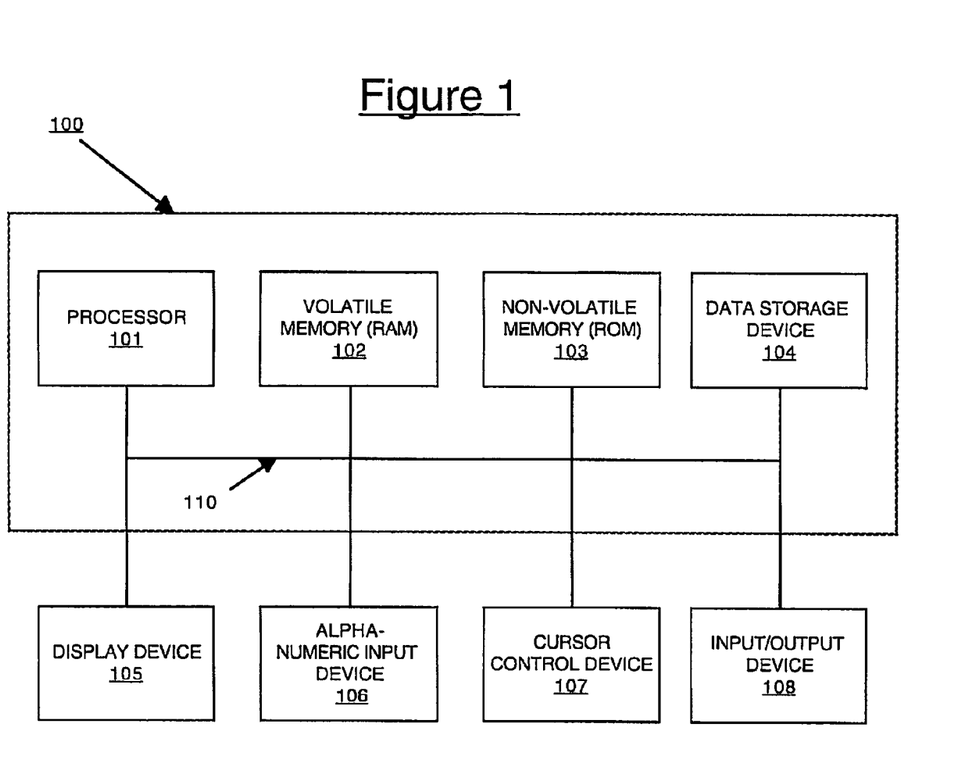
FIG. 1 is a block diagram of an exemplary computer system platform upon which embodiments of the present invention may be practiced.

Refer now to FIG. 1 that illustrates an exemplary computer system 100 upon which embodiments of the present invention may be practiced. In general, computer system 100 comprises bus 110 for communicating information, processor 101 coupled with bus 110 for processing information and instructions, random access (volatile) memory (RAM) 102 coupled with bus 110 for storing information and instructions for processor 101, read-only (non-volatile) memory (ROM) 103 coupled with bus 110 for storing static information and instructions for processor 101, data storage device 104 such as a magnetic or optical disk and disk drive coupled with bus 110 for storing information and instructions.

In one embodiment, computer system 100 comprises an optional user output device such as display device 105 coupled to bus 110 for displaying information to the computer user, an optional user input device such as alphanumeric input device 106 including alphanumeric and function keys coupled to bus 110 for communicating information and command selections to processor 101, and an optional user input device such as cursor control device 107 coupled to bus 110 for communicating user input information and command selections to processor 101. Furthermore, an optional input/output (I/O) device 108 is used to couple computer system 100 onto, for example, a network.

Display device 105 utilized with computer system 100 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
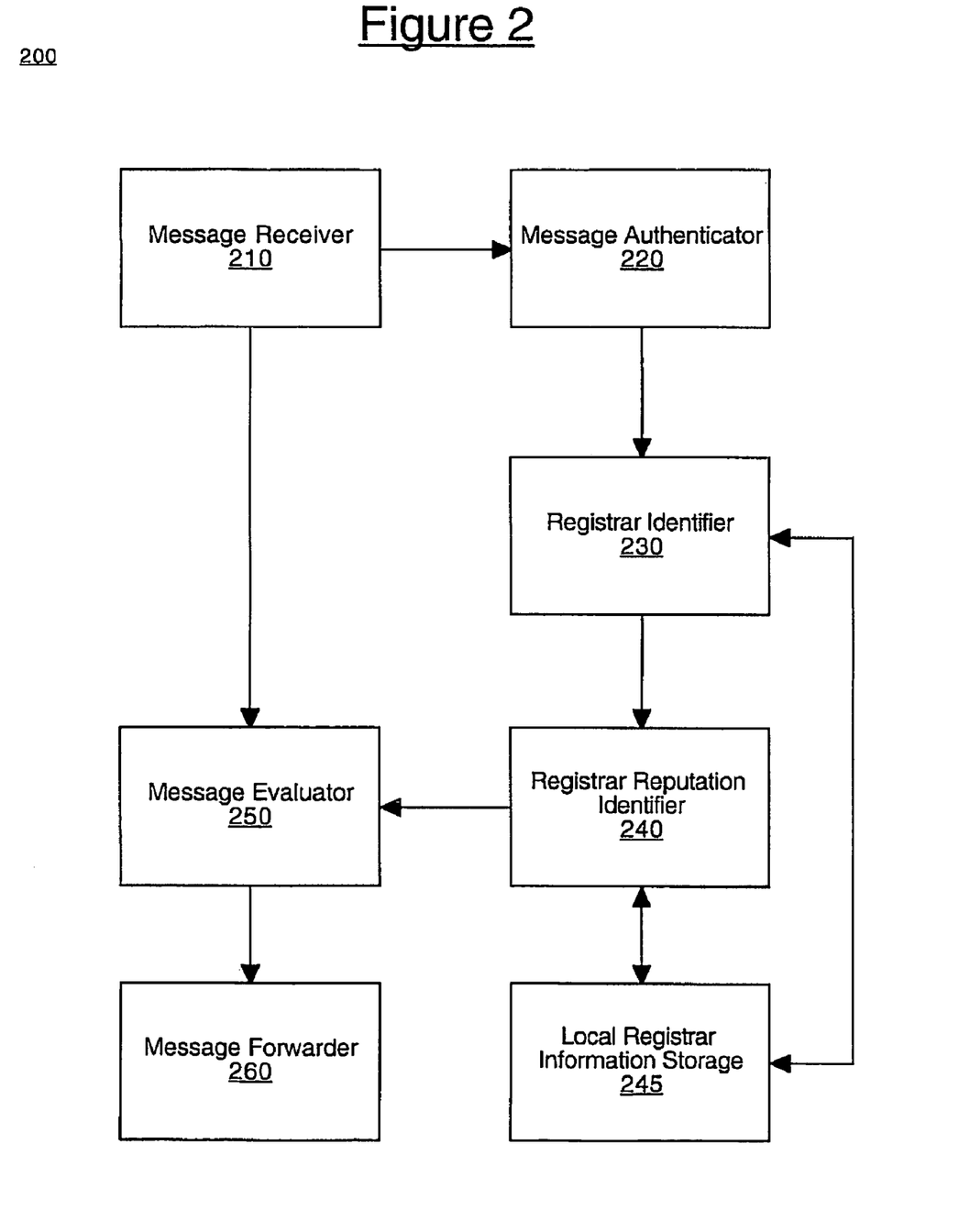
FIG. 2 is a block diagram of one embodiment of a system for evaluating a message based in part on a registrar reputation, in accordance with one embodiment of the present invention.

FIG. 2 is a block diagram of one embodiment of a system 200 for evaluating a message based in part on a registrar reputation, in accordance with one embodiment of the present invention. As depicted in FIG. 2, system 200 includes mail receiver 210, mail authenticator 220, registrar identifier 230, registrar reputation identifier 240, local registrar information storage 245, message evaluator 250, and message forwarder 260. System 200 is operable to evaluate whether a message is an unwanted message. In one embodiment, components of system 200 are operable to perform a method for evaluating the message based at least in part on a registrar reputation.

In one embodiment, mail receiver 210, mail authenticator 220, registrar identifier 230, registrar reputation identifier 240, local registrar information storage 245, message evaluator 250, and message forwarder 260 are comprised within a single computer system (e.g., computer system 100 of FIG. 1). In another embodiment, mail receiver 210, mail authenticator 220, registrar identifier 230, registrar reputation identifier 240, local registrar information storage 245, message evaluator 250, and message forwarder 260 are comprised within separate computer systems dispersed across a distributed computer network. It should be appreciated that various components of system 200 may distributed in any combination across a distributed computer network. In particular, it should be appreciated that the individual components themselves may be distributed across a distributed computer network.

Figure 3:
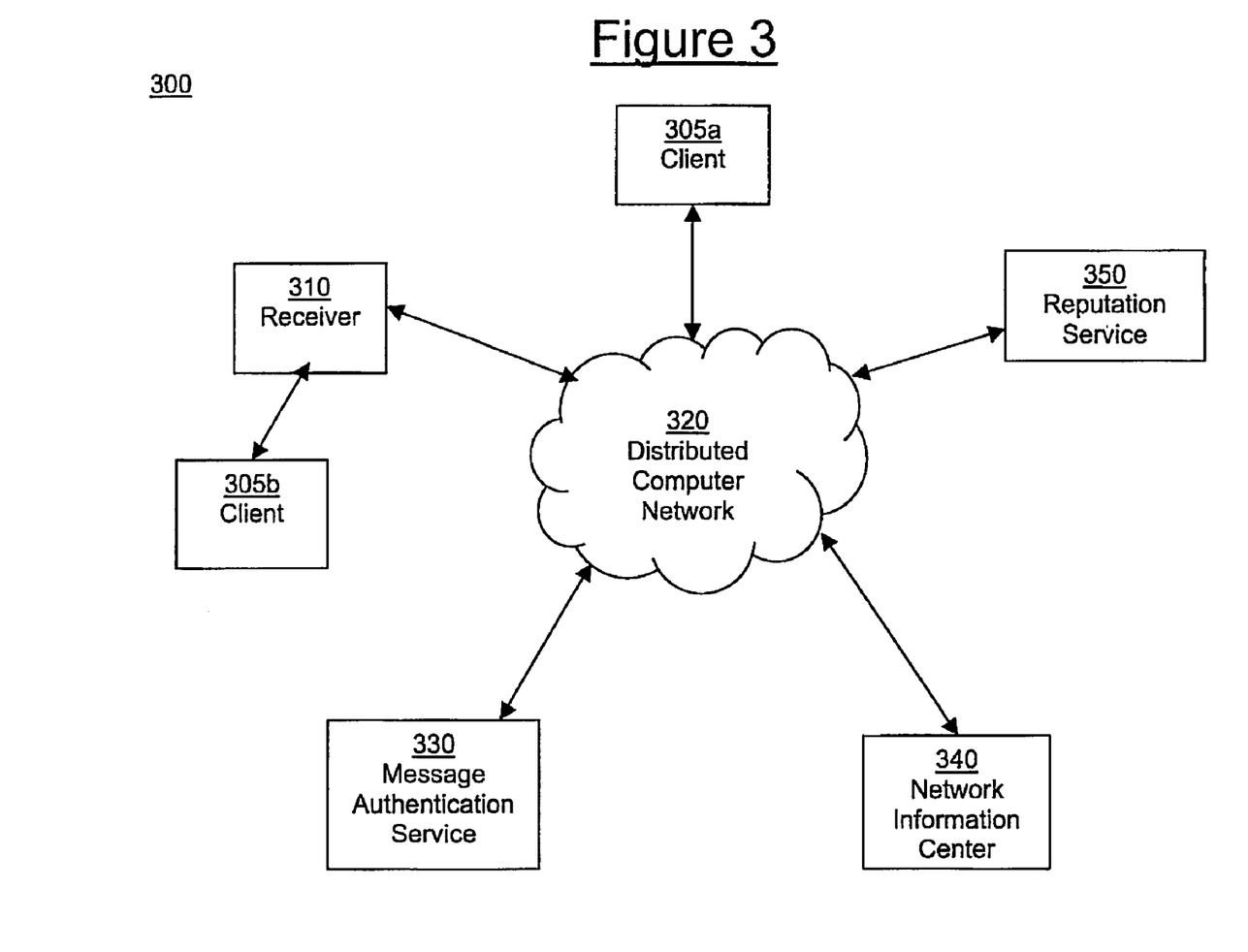
FIG. 3 is a block diagram of one embodiment of a system for determining a registrar reputation, in accordance with one embodiment of the present invention.

FIG. 3 is a block diagram of one embodiment of a system 300 for determining a registrar reputation, in accordance with one embodiment of the present invention. As depicted in FIG. 3, system 300 includes clients 305a and 305b, receiver 310, message authentication service 330, network information center (NIC) 340, and reputation service 350, all in communication via distributed computer network 320. System 300, in conjunction with system 200 of FIG. 2, is operable to determine a reputation for a registrar. In one embodiment, system 200 is located at receiver 310. In another embodiment, system 200 is located at client 305a. In particular, the components of system 200 communicate with the components of system 300 over distributed computer network 320 to obtain a registrar reputation for use in evaluating a message.

With reference to FIG. 2, message receiver 210 is configured for receiving a message including an indicator of the originator. In one embodiment, the message is an email message. However, it should be appreciated that the message can be any type of message having a valid packet originator, including but not limited to: an instant messaging (IM) message, a text messaging message such as a Short Message Service (SMS) message, an Internet protocol (IP) telephony message, and a net news message. It should be appreciated that the originator may include, but is not limited to, a domain name, or any other identifier for identifying a source of a message that has a centralized naming entity.

In one embodiment, message receiver 210 is a message transfer agent. An MTA is an application that transmits an email message through a network to a destination mail server, and ultimately to a mail user agent (MUA). For example, an MTA may reside at an Internet Service Provider (ISP) for evaluating messages prior to transmission to an MUA. For example, message receiver 210 may be an MTA when resident within receiver 310 of FIG. 3. In another embodiment, message receiver 210 is an MUA. An MUA is an application that supports user interaction with an email system for sending and receiving email messages. In one embodiment, an MUA is a software application resident on a computer system. In another embodiment, an MUA is a Web-based email application accessible over the Internet. For example, message receiver 210 may be an MUA when resident within client 305a or client 305b of FIG. 3.

Message authenticator 220 is configured for authenticating that the originator indicated in the message is the actual originator of the message. In one embodiment, message authenticator 220 is verifies the originator of the message according to the identified mail as described in co-pending, commonly-owned U.S. patent application Ser. No. 10/859,402, filed Jun. 1, 2004, by James Fenton et al., and entitled "A METHOD AND SYSTEM FOR VERIFYING IDENTIFICATION OF AN ELECTRONIC MAIL MESSAGE," which is incorporated herein by reference. It should be appreciated that message authenticator 220 may perform message verification in other ways, including but not limited to path-based message verification for verifying the identity of the sender by verifying the IP address of the message source, signature-based identification schemes including Pretty Good Privacy (PGP) and Secure Multipurpose Internet Mail Extensions (S/MIME), and certificate schemes. In one embodiment, message authenticator 220 communicates with message authentication service 330 of FIG. 3 in performing message verification.

Registrar identifier 230 is configured to perform a registrar lookup for determining the registrar of the originator. In one embodiment, registrar identifier 230 communicates with local registrar information storage 245 in determining the registrar. For example, system 200 may store previously identified registrars locally, such that communication with a remote NIC is not required. In another embodiment, registrar identifier 230 communicates with NIC 340 of FIG. 3 in determining the registrar. In one embodiment, registrar identifier 230 communicates with NIC 340 using the Whois protocol. However, it should be appreciated that NIC 340 may include registrar information using any format or protocol, as is understood by one skilled in the art.

Registrar reputation identifier 240 is configured to perform a registrar reputation lookup for determining the reputation of the registrar. In one embodiment, registrar reputation identifier 240 communicates with local registrar information storage 245 in determining the registrar. For example, system 200 may store the reputation for previously identified registrars locally, such that communication with a remote reputation service is not required. The reputation for previously identified registrars may expire after a predetermined time period. It should be appreciated that registrar information storage 245 is optional. In another embodiment, registrar reputation identifier 240 communicates with reputation service 350 of FIG. 3 in determining the reputation of the registrar.

With reference to FIG. 3, reputation service 350 is operable to evaluate the behavior of a registrar. For example, reputation service 350 may monitor the behavior of domains registered by a particular registrar. If the behavior of a domain indicates that the domain is distributing unwanted messages, such as spam, the behavior will be reflected in the reputation of the registrar. In one embodiment, the registrar reputation is in the form a numerical value, e.g., where a low value represents a poor reputation and a high value represents a good reputation, such that varying degrees of reputation may be provided. A poor reputation indicates that the registrar is more likely to register domains associated with the distribution of unwanted message, while a good reputation indicates that the registrar is less likely to register domains associated with the distribution of unwanted message. In another embodiment, the registrar reputation can be a binary value, such that a zero indicates a poor reputation and a one indicates a good reputation.

Returning to FIG. 2, message evaluator 250 is configured to evaluate the message based at least in part on the registrar reputation associated with the message. In one embodiment, message evaluator 250 is configured to determine whether the message is classified as an unwanted message based at least in part on the registrar reputation. It should be appreciated that message evaluator 250 may evaluate whether the message is an unwanted message using any heuristic model, metrics, or other system, and based on any other number of factors. For example, message evaluator 250 may determine whether the message is an unwanted message based on a combination of factors including but not limited to: the registrar reputation, whether the originator is authenticated (e.g., as determined by message authenticator 220), whether the message contains certain words, and an evaluation of other features of the message. Message evaluator 250 may assign scores to these factors, and compare the total score to a threshold value in determining whether a message is an unwanted message. In particular, the evaluation of the message is based at least in part on the registrar reputation associated with the message. Message forwarder 260 is operable to forward the message to the recipient if it is determined that the message is not an unwanted message.

Figure 4:
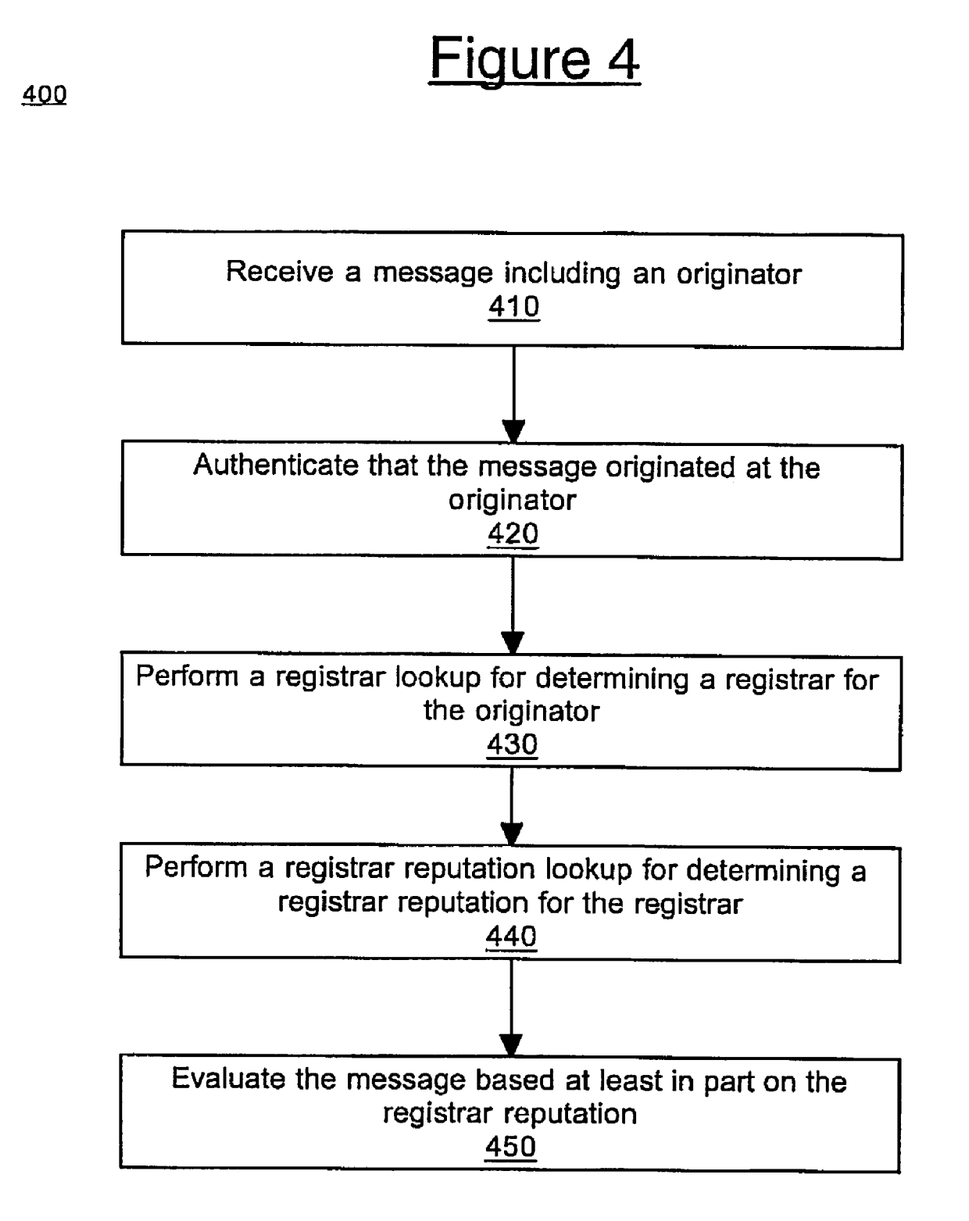
FIG. 4 is a flow chart illustrating a method for evaluating a message based in part on a registrar reputation, in accordance with one embodiment of the present invention.

FIG. 4 is a flow chart illustrating a method 400 for evaluating a message based in part on a registrar reputation, in accordance with one embodiment of the present invention. In one embodiment, method 400 is carried out by processors and electrical components under the control of computer readable and computer executable instructions. The computer readable and computer executable instructions reside, for example, in data storage features such as computer usable volatile and non-volatile memory (e.g., volatile memory 102 and non-volatile memory 103 of FIG. 1). However, the computer readable and computer executable instructions may reside in any type of computer readable medium. Although specific steps are disclosed in method 400, such steps are exemplary. That is, the embodiments of the present invention are well suited to performing various other steps or variations of the steps recited in FIG. 4. In one embodiment, method 400 is performed by system 200 of FIG. 2.

At step 410, a message including an originator is received. As described above, the message can be any type of message having a valid packet originator. In one embodiment, the message is an email message. At step 420, it is authenticated that the message originated at the originator. For example, where the originator indicates a domain name, it is authenticated that the message originated from the indicated domain.

Figure 5:
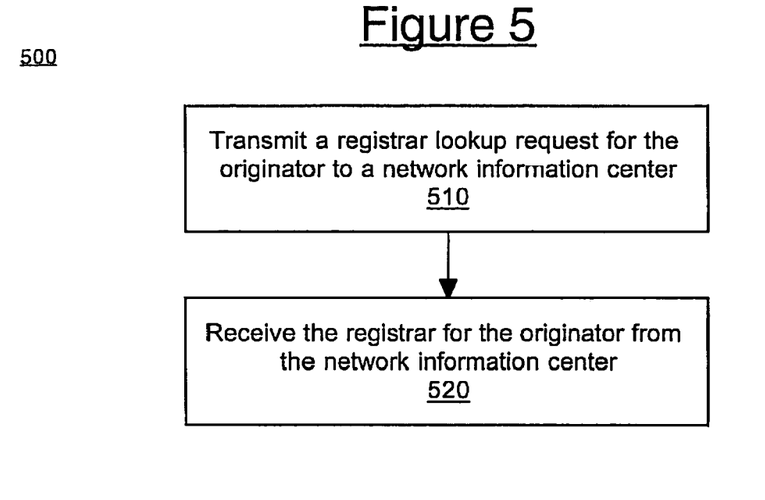
FIG. 5 is a flow chart illustrating a method for performing a registrar lookup, in accordance with one embodiment of the present invention.

At step 430, a registrar lookup for determining a registrar for the originator is performed. FIG. 5 is a flow chart illustrating a method 500 for performing a registrar lookup, in accordance with one embodiment of the present invention. At step 510, a registrar lookup request for the originator is transmitted to a NIC (e.g., NIC 340 of FIG. 3). In one embodiment, the registrar lookup request is transmitted to the NIC in accordance with Whois protocol. However, it should be appreciated that any other type of protocol may be used in transmitting the registrar lookup request. At step 520, the registrar for the originator is received from the NIC.

Figure 6:
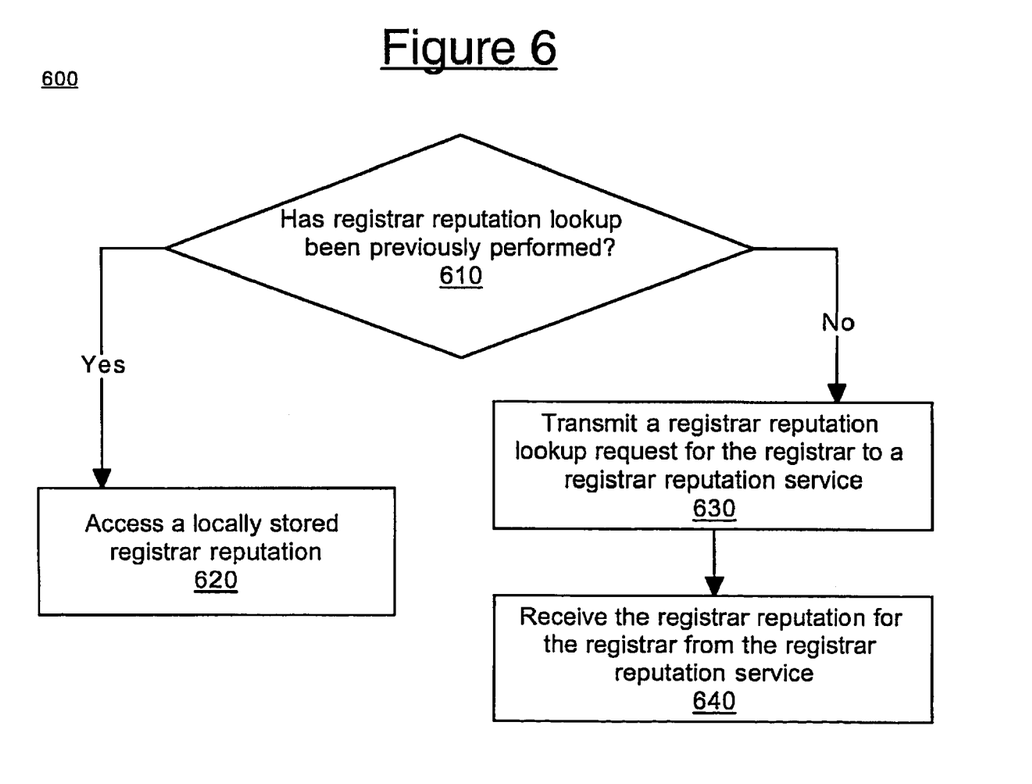
FIG. 6 is a flow chart illustrating a method for performing a registrar reputation lookup, in accordance with one embodiment of the present invention.

Returning to FIG. 4, at step 440, a registrar reputation lookup for determining a registrar reputation for registrar is performed. FIG. 6 is a flow chart illustrating a method 600 for performing a registrar reputation lookup, in accordance with one embodiment of the present invention. In one embodiment, as shown at step 610, it is determined whether the registrar reputation lookup has been previously performed for the registrar. For example, if a message associated with XYZ registrar is received, message receiver 210 of FIG. 2 determines whether a reputation lookup for XYZ registrar has previously been performed. In one embodiment, prior registrar reputation lookups are stored locally (e.g., at local registrar information storage 245). It should be appreciated that stored registrar reputations may be set to expire after a predetermined time period.

If the registrar reputation lookup has been previously performed for the registrar, as shown at step 620, a locally stored registrar reputation is accessed. Alternatively, if the registrar reputation lookup has not been previously performed for the registrar, as shown at 630, a registrar reputation lookup request for the registrar is transmitted to a registrar reputation service (e.g., reputation service 350 of FIG. 3). At step 640, the registrar reputation for the registrar is received from the registrar reputation service. It should be appreciated that steps 610 and 620 are optional, such that no reputation information is stored locally.

With reference to FIG. 4, at step 450 the message is evaluated based at least in part on the registrar reputation. In one embodiment, it is determined whether the message is classified as an unwanted message based at least in part on the registrar reputation. As described above, the registrar reputation may be used as one of a number of factors in determining whether the message is an unwanted message.

The described embodiments of the present invention provide a system and method for evaluating a message based at least in part on the registrar reputation. A reputation service provides a binding between the reputation of a given registrar and the identity of the registrar. A message receiver determines the registrar associated with an originator of a message, and accesses reputation information for the registrar. This reputation information is used for determining whether a message is an unwanted message, such as spam. By utilizing the reputation of a registrar in making a determination as to whether a message is unwanted, the present invention places pressure on registrars to not facilitate the distribution of unwanted messages. The present invention narrows the delivery options of spammers, to the advantage of mail recipients.

Various embodiments of the present invention, a system and method for evaluating a message based at least in part on the registrar reputation, are thus described. While the present invention has been described in particular embodiments, it should be appreciated that the present invention should not be construed as limited by such embodiments, but rather construed according to the below claims.

What is claimed is:

1. A method for evaluating a message comprising:
   receiving said message including an originator;
   authenticating that said message originated at said originator;
   performing a registrar lookup to determine a registrar for said originator;
   performing a registrar reputation lookup for determining a registrar reputation for said registrar, wherein said registrar reputation is based at least in part on a monitored behavior of said registrar in registering one or more domains associated with a distribution of unwanted messages;
   calculating a registrar reputation factor based upon the registrar reputation;
   determining whether said message includes a specific feature;
   calculating a specific feature factor;
   determining whether said message includes a specific character string;
   calculating a specific character string factor;
   summing the registrar reputation factor, the specific feature factor, and the specific character string factor to obtain a total score; and
   comparing the total score with a threshold value.

2. The method as recited in claim 1 further comprising:
   rejecting said message if the total score is less than the threshold value; and
   forwarding said message if the total score is equal to or greater than the threshold value.

3. The method as recited in claim 1 wherein said message is an electronic mail message and said unwanted messages include spam.

4. The method as recited in claim 1 wherein said performing said registrar lookup comprises:
   transmitting a registrar lookup request for said originator to a network information center; and
   receiving said registrar for said originator from said network information center.

5. The method as recited in claim 4 wherein said registrar lookup request is transmitted to said network information center in accordance with WHOIS protocol.

6. The method as recited in claim 1 wherein said performing said registrar reputation lookup comprises:
   transmitting a registrar reputation lookup request for said registrar to a registrar reputation service; and
   receiving said registrar reputation for said registrar from said registrar reputation service.

7. The method as recited in claim 1 wherein said performing said registrar reputation lookup comprises:
   determining whether said registrar reputation lookup has been previously performed for said registrar;
   if said registrar reputation lookup has been previously performed for said registrar, accessing a locally stored registrar reputation; and
   if said registrar reputation lookup has not been previously performed for said registrar, transmitting a registrar reputation lookup request for said registrar to a registrar reputation service.

8. A system for evaluating a message comprising:
   a message receiver configured to receive said message, wherein said message includes an originator;
   a message authenticator configured to authenticate that said message originated at said originator;
   a registrar identifier configured to determine a registrar for said originator;
   a registrar reputation identifier configured to determine a registrar reputation for said registrar, wherein said registrar reputation is based at least in part on a number of domains registered by said registrar over a period of time, said number of domains exhibiting a behavior of sending unwanted messages; and
   a message evaluator configured to evaluate said message based upon the sum of a registrar reputation factor, a specific feature factor, and a specific character string factor.

9. The system as recited in claim 8 wherein said message is rejected if the sum is less than a threshold value, and wherein said message is forwarded if the sum is equal to or greater than the threshold value.

10. The system as recited in claim 8 wherein said behavior of domains includes distributing an unwanted message.

11. The system as recited in claim 10 wherein said unwanted message is identified as spam.

12. The system as recited in claim 8 wherein said registrar identifier comprises a remote network information center.

13. The system as recited in claim 8 wherein said registrar reputation indicates a likelihood of said registrar registering a domain associated with a distribution of unwanted messages.

14. The system as recited in claim 8 wherein said message evaluator is configured to determine whether said message is classified as an unwanted message based at least in part on said registrar reputation.

15. A computer-readable medium having computer-readable program code embodied therein for causing a computer system to perform a method for evaluating a message, said method comprising:
   receiving said message including an originator;
   authenticating that said message originated at said originator;
   performing a registrar lookup to determine a registrar for said originator;
   performing a registrar reputation lookup for determining a registrar reputation for said registrar, wherein said registrar reputation is based at least in part on a likelihood of said register registering one or more domains associated with a distribution of unwanted messages;
   calculating a registrar reputation factor based upon the registrar reputation;
   determining whether said message includes a specific feature;
   calculating a specific feature factor;
   determining whether said message includes a specific character string;
   calculating a specific character string factor;
   summing the registrar reputation factor, the specific feature factor, and the specific character string factor to obtain a total score; and
   comparing the total score with a threshold value.

16. The computer-readable medium as recited in claim 15 wherein said method further comprises:
   rejecting said message if the total score is less than the threshold value; and
   forwarding said message if the total score is equal to or greater than the threshold value.

17. The computer-readable medium as recited in claim 15 wherein said likelihood is determined from a number of registered domains associated with said distribution of unwanted messages over a period of time.

18. The computer-readable medium as recited in claim 15 wherein said registrar reputation expires after a predetermined time period.

19. A system for evaluating a message comprising:
   means for receiving said message, wherein said message includes an originator;
   means for authenticating that said message originated at said originator;
   means for determining a registrar for said originator;
   means for determining a registrar reputation for said registrar, wherein said registrar reputation is based at least in part on a history of said registrar in registering multiple domains associated with a distribution of unwanted messages;
   means for calculating a registrar reputation factor based upon the registrar reputation;
   means for determining whether said message includes a specific feature;
   means for calculating a specific feature factor;
   means for determining whether said message includes a specific character string;
   means for calculating a specific character string factor;
   means for combining the registrar reputation factor, the specific feature factor, and the specific character string factor to obtain a total score; and
   means for comparing the total score with a threshold value.

20. The system of claim 19 further comprising:
   means for rejecting said message if the total score is less than the threshold value; and
   means for forwarding said message if the total score is equal to or greater than the threshold value.

21. The system of claim 19 wherein said means for determining a registrar reputation comprises:
   means for determining whether said registrar reputation lookup has been previously determined for said registrar;
   means for accessing a locally stored registrar reputation, if said registrar reputation lookup has been previously determined for said registrar; and
   means for transmitting a registrar reputation lookup request for said registrar to a registrar reputation service, if said registrar reputation lookup has not been previously performed for said registrar.

* * * * *